US005788867A

United States Patent [19]
Pearson

[11] Patent Number: 5,788,867
[45] Date of Patent: Aug. 4, 1998

[54] METHOD OF STABILIZING RED MUD WASTE SLURRIES

[75] Inventor: Stephen Charles Pearson, Sandy, Utah

[73] Assignee: Cytec Technology Corp., Stamford, Conn.

[21] Appl. No.: 810,281

[22] Filed: Mar. 3, 1997

Related U.S. Application Data

[63] Continuation of Ser. No. 289,966, Aug. 12, 1994, abandoned.

[51] Int. Cl.⁶ ............................ C02F 1/56; B03D 103/02
[52] U.S. Cl. ........................ 210/733; 523/129; 523/334; 210/705
[58] Field of Search ........................... 523/334, 129; 423/122; 210/733

[56] References Cited

U.S. PATENT DOCUMENTS

| 4,608,237 | 8/1986 | Roe et al. ............................ 423/122 |
| 4,767,540 | 8/1988 | Spitzer et al. ....................... 210/733 |
| 4,880,858 | 11/1989 | Farrar et al. ......................... 524/60 |
| 4,954,547 | 9/1990 | Branning ............................ 524/232 |
| 4,956,400 | 9/1990 | Kozakiewicz et al. ............... 523/223 |
| 5,405,898 | 4/1995 | Sommese ............................ 525/377 |
| 5,518,634 | 5/1996 | Pillai et al. ........................... 210/733 |

Primary Examiner—Tae Yoon
Attorney, Agent, or Firm—Pennie & Edmonds LLP

[57] ABSTRACT

This invention relates to processes for modifying the flow characteristics of slurries, particularly mineral slurries such as red mud from the Bayer process, using water-soluble polymeric emulsions to increase the slurries' angle of repose.

13 Claims, No Drawings

5,788,867

METHOD OF STABILIZING RED MUD WASTE SLURRIES

This is a continuation of application Ser. No. 08/289,966, filed on Aug. 12, 1994, now abandoned, which is hereby incorporated herein by reference.

FIELD OF THE INVENTION

This invention is generally directed to processes for stabilizing the flow characteristics of fluid slurries of solids to permit the slurries to be stacked in piles; the stabilized compositions resulting therefrom constitute another embodiment of this invention. The invention more specifically relates to processes by which mineral slurries, such as the tailings produced by mineral extraction processes, may be treated to dispose of it in a more efficient, cost effective manner. Specifically, it relates to the tailings generated from the Bayer process used to extract alumina from bauxite ore and methods for stacking such tailings.

BACKGROUND OF THE INVENTION

Most ore beneficiation processes function by reducing the ore to the form of a slurry of particulate solids. Once the desired mineral has been extracted, the waste from the process remains in the form of a slurry or liquid dispersions of particulate solids. Disposal of these wastes, typically referred to as tailings, often dictates that they be impounded until sufficient water has been removed by drainage and/or evaporation to render the tailings more solid. Such dewatering usually takes years and as a result, sufficient storage capacity to impound the tailings, perhaps for the life of the mine and beyond, is in demand. In low-lying or flat areas impoundment may take the form of elevated dikes which can rupture This can effectively limit the height of the dike to that which can be supported by an unreenforced earthen berm. As a result, those using elevated impoundments are forced to assign new land for disposal of the tailings, build the associated berms and monitor and repair the dikes. This increases disposal costs as well as the costs associated with the maintenance of the facility. By stabilizing the flow characteristics of the tailings waste to increase their angle of repose, disposal costs can be reduced and the land available for disposal may be used more efficiently.

Red mud resulting from a Bayer alumina process, for example, is typically washed with a flocculant-containing wash liquor, thickened to increase the solids content, dewatered and then disposed of and/or subject to further drying for subsequent disposal in a mud stacking area. To be suitable for stacking, the flow characteristics of the red mud should be such that, when stacked, the mud holds its shape and is relatively rigid, having an angle of repose as high as possible so that the stacked mud occupies a minimal area for a given volume.

The flow characteristics of tailings can be described by their stacking angle or "angle of repose'" which is the maximum angle to the horizontal in which the tailings will remain without flow. For stacking many types of tailings the angle of repose' is one degree. This means that if the tailings slurry is titled at any angle greater than one degree, the tailings slurry will flow. Economically speaking, it has been estimated that an increase of the angle of repose' to as little as five degrees can result in significant savings.

Consequently, there is a need for stabilizing mineral slurries such as red mud which involves modifying the flow characteristics of the slurries to increase their angle of repose and preferably to modify the flow characteristics to permit the slurries to be stacked, thereby reducing costs of their disposal and facilitating a more effective use of the land.

Historically, efforts have been made to improve the efficiency of tailings disposal. One method involves dewatering the tailings by some mechanical means, such as filtration or centrifugation. Water-soluble polymeric emulsions have been used as flocculants, generally in the form of inverted dilute solutions, in dewatering applications for solid liquid separations. Though dewatering can be effective, it can be expensive to conduct and may not be practical or efficient for treating large volumes of material. Another method involves the addition of solid materials, such as sand, which serves to raise the solids to water ratio and broaden the size distribution of the solids to modify the flow characteristics of the tailings. This method can also be effective but has a disadvantage in that large quantities of solids are needed to be effective, which then increases the volume of tailings that need to be disposed.

A method of treating red mud is disclosed in European Patent Application EP388108. In that patent application, red mud from a Bayer process is blended with particles of water absorbent, water-insoluble polymer and the mixture is allowed to stand and rigidify. The process disclosed is believed by the patentee to be particularly suitable for treating materials having dispersed particulate solids of very small particle size, though generally aqueous liquids of dispersed particulate solids are also disclosed. The water-insoluble polymers may be added in the form of bonded aggregates or a dispersion in water immiscible liquid.

It has been surprisingly discovered that water-soluble polymers in the form of an inverse (water-in-oil) emulsion can be used to stabilize slurries of particulate solids, including tailings and preferably mineral slurries, such as red mud, to modify their flow characteristics to increase their angle of repose and render the slurries stackable for maximizing the usage of waste storage space. In the stabilization process, the water-soluble polymers surprisingly appear to function as a binder, rather than a flocculant. Moreover, the stabilizing effectiveness of the water-soluble polymers is surprisingly enhanced when they are used in their inverse emulsion form, rather than first being inverted to form a dilute aqueous solution, as such polymers are typically used in the art. See, for example U.S. Pat. No. 4,767,540.

Further, it has also been surprisingly discovered that diluting the polymeric emulsion with a diluent which does not break the emulsion will enhance the polymer's performance. This diluent may be a hydrocarbon, and is preferably air. Any water-soluble polymer may be used as long as they are in inverse emulsion form or inverse microemulsion form (all emulsions and microemulsions referred herein are inverse). For purpose of this invention, the term emulsion includes microemulsions. Certain polymers may be preferred, however, depending on the slurry being treated. Anionic polymers such as ammonium polyacrylate have been found, for example, to be particularly effective for stabilizing red mud resulting from a Bayer process. The term stabilize herein refers to a modification of flow characteristics which reduces the slurries' ability to flow under its own weight, and preferably increases the angle of repose' of the slurry being stabilized, without having to eliminate the liquid in the slurry. Preferably stabilization renders the slurry stackable. The term stacking is known in the art and, as used herein, contemplates the placement of a slurry in a pile.

SUMMARY OF THE INVENTION

According to the present invention, there is provided, in a general sense, a process for stabilizing an aqueous slurry of particulate solids which comprises admixing an emulsion, in an amount sufficient to stabilize the slurry, with the slurry wherein the emulsion has a discontinuous aqueous phase comprising a water-soluble polymer. The stabilized slurrys which comprise a water-soluble polymer-containing emulsion admixed with an aqueous slurry of particulate solids are another embodiment of the invention. The slurrys are preferably mineral slurries more preferably mineral tailings waste.

A distinctly preferred embodiment of the invention relates to processes for stabilizing red mud from the Bayer process which comprises admixing an emulsion, in an amount sufficient to stabilize the red mud, with the red mud, wherein the emulsion has a discontinuous aqueous phase comprising a water-soluble polymer; the stabilized red mud resulting from the admixture of a water-soluble polymer-containing emulsion and red mud is also contemplated in the present invention. Anionic water-soluble polymer emulsions are preferred for treating red mud.

In yet another embodiment of the instant invention a process for stacking a slurry, preferably aqueous, of particulate solids is provided which comprises the steps of:

a. admixing said slurry with an amount of emulsion sufficient to stabilize said slurry, wherein said emulsion comprises water-soluble polymer; and b. stacking said stabilized slurry.

The processes for stacking are preferably directed to mineral slurries, more preferably red mud.

DETAILED DESCRIPTION OF THE INVENTION

The process of the instant invention is suitable for treating liquid, preferably aqueous, slurries of particulate solids including liquid dispersions and preferably mineral slurries. Mineral slurries encompass slurries that result from the processing of minerals which includes ore beneficiation and the extraction of minerals. Minerals broadly include ores, natural substances, inorganics, mixtures of inorganic substances and organic derivatives such as coal. The slurries that may be stabilized in accordance with this invention can contain any amount of suspended particulate solids, preferably at least about 20 weight percent. Typical slurries that are stabilized according to the instant invention include but are not limited to aqueous dispersions, preferably tailings or mineral slurries obtained from a platinum ore body, a body of coal, a copper ore body, a tar sand body, an ore-body from a diamond mine, phosphate and gold slimes. Aqueous slurries of particulate solids that comprise a clay are also contemplated. A process for stacking aqueous slurrys comprising particulate solids, either organic or inorganic, is also contemplated by the instant invention. A major use of the present invention is in the stabilization of red mud from the Bayer alumina process, preferably red mud from a washer or final thickener of a Bayer process. The red mud may be the solids from the final thickener stage by the addition of flocculant alone or the filter cake from the pressure filtration of the slurry produced in the final wash stage. The slurrys of mineral solids are contacted with a water-soluble polymer in the form of an emulsion—macroemulsion or microemulsion.

The types of polymers suitable for the processes and compositions of the present invention broadly include any type of water-soluble polymer, as this term is used in the art, including any cationic, anionic, non-ionic or amphoteric polymer. It is possible that certain types of polymers may not effectively stabilize certain types of dispersions, though this can be readily determined by simple experimentation by one skilled in the art. Suitable polymers may be homopolymers or copolymers of vinyl addition or ethylenically unsaturated monomers, which preferably readily undergo addition polymerization. The phrase "polymer containing monomer units" includes reaction products of two or more vinyl monomers as well as homopolymers that have been functionalized such as, for example, polyacrylamide that has been functionalized with a Mannich group as described in U.S. Pat. No. 4,956,399 which is incorporated herein by reference.

The preferred anionic monomers for preparing the polymers used in the instant invention generally include acrylic acid, methacrylic acid, ethacrylic acid and their alkali metal or ammonium salts, vinyl sulfonic acid, 2-acrylamido-2-alkylsulfonic acids where the alkyl group contains 1 to 6 carbon atoms, such as acrylamido 2-methyl propanesulfonic acid or mixtures of any of the foregoing and their alkaline metal or ammonium salts. The anionic monomers may be copolymerized with (alk)acrylamide, preferably acrylamide or methacrylamide. Polymers made from anionic monomers, preferably those described above, tend to be preferred for stabilizing red mud from a Bayer process. Polymers containing at least about 10 mole percent anionic functionality, based on monomer, more preferably at least about 30 mole percent anionic functionality are desirable. Polymers containing higher amounts of anionic functionality such as at least 50 mole percent, based on monomer, may be most preferred in certain applications.

Preferred cationic monomers for preparing the polymers used in the instant invention include dialkylaminoalkyl (meth)acrylates and dialkylaminoalkyl (meth) acrylamides, including their acid addition or quaternary ammonium salts, diallyl dialkyl ammonium halides, vinyl benzyltrialkyl ammonium salts, polymers formed by the reaction between an epihalohydrin or dihaloalkane and an amine, and the like. Quaternized Mannich or dialkyl amino methylated (alk) acrylamide polymers such as quaternary N-trimethylaminomethylacrylamide prepared by functionalizing (alk)acrylamide or poly(alk)acrylamide may be particularly preferred for certain applications. Specific examples of preferred cationic monomers include, N-dimethylaminomethyl acrylamide; acryloxyethyltrimethylammonium chloride; methacryloxyethyltrimethylammonium chloride; 2-methacryloyloxyethyl trimethyl ammonium methosulfate, 2-methacryloyloxyethyl trimethyl ammonium chloride; diallydimethylammonium chloride; 3-acrylamido-3-methyl butyl trimethyl ammonium chloride, 2-acrylamido-2-methyl propyl trimethyl ammonium chloride, 3-methacryloyl-2-hydroxy propyl trimethyl ammonium chloride, dimethylaminoethylacrylate, dimethylaminoethylmethacrylate or mixtures of any of the foregoing. Mixtures of any of the above cationic monomers together with (meth)acrylamide are also useful.

The preferred ethylenically unsaturated non-ionic monomers for use in the process and compositions of the present invention are selected from acrylamide; methacrylamide; dialkylaminoethyl acrylamides; N,N-dialkylacrylamides; N-alkylacrylamides; N-vinyl-acetamide; N-vinyl formamide; N-vinyl pyrrolidone and mixtures thereof. Especially preferred is acrylamide and methacrylamide.

The preferred amphoteric polymers for use in the present invention comprise copolymers of one or more of the foregoing anionic monomers and one or more of the cationic ethylenically unsaturated monomers listed above or monomers which contain both anionic and cationic functionalities. Very small amounts of hydrophobic comonomers can be included in the polymers employed in the invention such as styrene, methylmethacrylate, methylacrylates, (meth) acrylate esters containing 1–16 carbons, vinyl acetate and higher esters, acrylonitrile, vinyl chloride and the like provided that the polymer remains water soluble. It is understood that the present invention is not limited to the description of monomers, comonomers, polymers and copolymers herein. The molecular weights of the polymers used in the instant invention are not critical and can range from a few hundred thousand to ten million.

It may be preferred, particularly in stabilizing red mud, to employ an anionic polymer, preferably a highly charged anionic polymer containing at least about 20 mole percent anionic functionality, more preferably 30 mole percent anionic functionality. Ammonium polyacrylate and acrylamidelammonium acrylate copolymers have been found to be particularly preferred for stabilizing red mud.

The amount of water-soluble polymer in the emulsion or microemulsion can be any amount found effective for stabilizing a slurry. Such amounts will vary, depending on the substrate treated and can be determined by routine experimentation by one skilled in the art. Generally, though, the polymer solids in the emulsion ranges up to about 60 percent by weight from about 5 to about 50 percent by weight, more preferably, about 20 to about 40 percent by weight, based on the weight of the emulsion. The polymers can be employed in macroemulsion form and may also be used as a microemulsion. The emulsion polymers used in the instant invention may be prepared by conventional macroemulsion polymerization methods known in the art. Macroemulsions are known to those skilled in the art. Any known polymerizable water-soluble ethylenic unsaturated monomer, including those specifically described above, which produce water-soluble polymers that are insoluble in the continuous oil phase, and can be polymerized, may be used to prepare the inverse macroemulsions used in the process of the present invention. The water-soluble monomers and monomer mixtures are polymerized to low or high molecular weight polymers or copolymers using a water-in-oil emulsion polymerization procedure in which the water-soluble monomers are emulsified in an oil phase by means of a water-in-oil emulsifier and subject to polymerization conditions to form the inverse emulsion. The monomer content in the aqueous solution can vary anywhere between about 5 and 100% by weight monomer, though this may vary depending on the monomer and temperature of polymerization. Thus, the discontinuous phase or droplets are usually aqueous but may consist of 100% polymer, and 0% water and are prepared using methods known in the art.

The ratio of the aqueous phase, which is defined as the monomers or polymer and water, to oil phase widely varies between about 0.1:1 to about 4:1, preferably, between about 1:1 to 4:1. The oil phase includes the hydrocarbon liquid and the surfactant dissolved or dispersed therein.

An emulsifying agent of the water-in-oil type is used in amounts ranging from about 1 to about 6% by weight of the aqueous phase, in order to emulsify the monomer-containing aqueous phase into the oil phase. A wide variety of conventional water-in-oil emulsifying agents which are typically used to prepare macroemulsions may be used, such hexadecyl sodium phthalate, sorbitan monoleate, sorbitan monostearate, cetyl or stearyl sodium phthalate, metal soaps, and the like. Upon performing relatively simple tests one skilled in the art would be capable of determining whether a specific water-in-oil emulsifying agent or emulsifier mixture would be adequate for a particular system.

The oil phase can be any inert hydrophobic liquid such as, for example, hydrocarbons, perchloroethylene, aryl hydrocarbons, such as toluene and xylene. Preferably paraffin solvents are used.

Polymerization of the emulsion may be carried out pursuant to those methods known in the art, including high energy irradiation such as gamma irradiation $CO^{60}$, ultraviolet irradiation or the like. Free radical initiators may also be used, such as potassium persulfate, as well as azo compounds, peroxides and redox pairs or the like. Certain polymerization methods may preferably be carried out at elevated temperatures.

Preferably, the emulsifying agent is dissolved in the oil phase and the monomer-containing aqueous phase is added to the oil phase with agitation until the aqueous phase is emulsified in the oil phase. Additional conventional additives such as chelating agents, breaker surfactants, and small amounts of chain transfer agents may also be dissolved in the aqueous phase or mixed into the inverse emulsion. The breaking rate of the emulsion polymers may be adjusted by one skilled in the art by the addition of a breaker surfactant or a mixture of breaker surfactants to suit the conditions desired. Polymerization agents, such as free radical initiators, may be dissolved in the oil or aqueous phase or the emulsion. Polymerization is conducted typically with agitation, until conversion is substantially complete. The resulting polymeric emulsion may be subsequently stabilized or treated according to any methods known in the art.

The polymers may also be used in the process of the instant invention in microemulsion form. Though the term microemulsion is well understood and used in the art, a microemulsion, for purposes of this invention, is generally defined as a thermodynamically stable composition comprising two liquids or phases which are insoluble in each other along with a surfactant or surfactant mixture. Polymeric inverse microemulsions which contain a continuous oil phase and a polymer-containing discontinuous phase (usually aqueous) are prepared from thermodynamically stable monomer microemulsions. Inverse microemulsions have a narrow droplet size distribution and are usually, but not always, optically transparent. The discontinuous polymer-containing phase of microemulsions form droplets or micelles, which are usually aqueous and usually have a volume average droplet diameter which is less than about 2500 Å, preferably less than about 2000 Å and most preferably less than about 1000 Å. Possibly, some microemulsions may have a volume average droplet diameter as large as about 3000 Å.

Conventional microemulsion polymerization techniques as disclosed in, for example, U.S. Pat. Nos. 5,037,881; 5,037,863; 4,681,912 and 4,521,317, the disclosures of each of which are incorporated herein by reference, may be employed for preparing water soluble polymers in microemulsion form.

Generally, microemulsion polymerization is produced by (i) preparing a monomer containing microemulsion by mixing an aqueous solution of monomers with a hydrocarbon liquid containing an appropriate amount of surfactant or surfactant mixture to form a water-in-oil microemulsion comprising droplets dispersed in a continuous oil phase and (ii) subjecting the monomer-containing microemulsion to polymerization conditions. It is not necessary to apply energy, e.g., apply shear, to the microemulsion to obtain the small droplets, although a microemulsion prepared as disclosed herein, which is also is subject to shear is not beyond the scope of this invention.

The formation of the inverse microemulsion depends on the proper selection of surfactant concentration and the hydrophilic-lypophylic balance (HLB) of the surfact or surfactant mixture. Temperature, nature of the oil phase and composition of the aqueous phase will also affect inverse microemulsion formation.

The one or more surfactants selected should provide an HLB value ranging from about 8 to about 12. Though the required HLB may vary from this, depending on the nature of the monomers, the nature and proportion of comonomer (if any) and the nature of the oil phase, typically outside this range, formation of inverse microemulsions cannot be attained. In addition to the appropriate HLB range, the surfactant concentration must be sufficient to form an inverse microemulsion. Too low surfactant concentrations will not result in the formation of a microemulsion, while excessively high concentrations will increase costs without imparting significant benefit. Typical surfactants useful in preparing the microemulsion used for the present invention include anionic, cationic and nonionic surfactants. Preferred surfactants include polyoxyetheylene sorbitol fatty acids, sorbitan sesquiolate, polyoxyetheylene sorbitan trioleate, sorbitan monooleate, polyoxyethylene (20) sorbitan monooleate, sodium dioctylsulfosuccinate, oleamidopropyi-dimethyl amine, sodium isostearyl-2-lactate, polyoxyethylene sorbitol monooleate or mixtures thereof and the like.

The selection of the organic phase has a substantial effect on the minimum surfactant concentration necessary to obtain the inverse microemulsion and may consist of hydrocarbons or hydrocarbon mixtures. Isoparafinic hydrocarbons or mixtures thereof are most desirable in order to obtain inexpensive formulations. Typically the organic phase will comprise mineral oil, toluene, fuel oil, kerosene, odorless mineral spirits, mixtures of any of the foregoing and the like.

Polymerization of the microemulsion may be carried out in any manner known to those skilled in the art. Initiation may be affected with a variety of thermal and redox free radical initiators, including peroxides, e.g. t-butyl hydroperoxide; azo compounds, e.g. azobisisobutyronitrile; inorganic compounds, such as potassium per sulfate and redox couples, such as ferrous ammonium sulfate/ammonium persulfate. Initiator addition may be affected any time prior to the actual polymerization per se. Polymerization may also be affected by photochemical irradiation processes, such as ultraviolet irradiation or by ionizing irradiation from a cobalt 60 source.

Typically the surfactant and oil are pre-mixed and added to an aqueous solution which contains the monomers and optional comonomers as defined above and any conventional additives such as, but not limited to, chelating agents such as ethylenediaminetetraacetic acid, chain transfer agents, breaker surfactants pH adjusters, initiators and the like. Once the aqueous and oil solutions are combined, an inverse microemulsion forms, without the need for shearing. Methods known in the art may be used to physically stabilize the polymeric microemulsion.

The water-soluble polymers in emulsion form are known in the art as flocculants and typically contain polymer solids that range anywhere from about 15 to about 50 percent, preferably about 25 to about 41 percent based on the total weight of the emulsion. It is preferred to dilute the emulsion polymer with a diluent, preferably a hydrocarbon liquid, more preferably a gas such as air, which will not invert the emulsion (render the aqueous phase the continuous phase) when added thereto. The aforesaid dilution can improve stabilization of the slurries of mineral solids such as red mud. Suitable diluents include but are not limited to mineral oil, kerosene, fuel oil, odorless mineral spirits and any mixtures of the forgoing and gases such as air or any of its component gases or the like. The diluent, whether liquid or gas, should not be capable of reacting with the emulsion polymer. The amount of diluent added may be any amount found by the skilled artisan to enhance stabilization, through routine experimentation, using a desired polymer on the medium being treated. Generally, improved results can be obtained when the polymeric emulsions are diluted with diluent to a final volume of up to 50 or more times the initial polymer emulsion volume, though dilutions of this high order may not be practical and can cause emulsion settling and increase emulsion product shipping costs, if the diluent is liquid. For these reasons, air may be preferred. Preferably, emulsions are diluted up to about ten-fold, more preferably from about 2 to about 10 times the initial total emulsion volume. Most preferably, the emulsion polymers may be diluted from about 4 to about 6 times the initial emulsion volume. Though use of a liquid diluent can increase emulsion product and shipping costs, such disadvantages can be mitigated by diluting the emulsions on site immediately prior to admixing the emulsion polymer with the slurry tailings. It is merely important that the diluent added, in whatever amount or form, not break the emulsion, since emulsions inverted to form dilute aqueous solutions containing polymer concentrations on the order of about 1 to 2 percent tend to give poorer results.

Typical polymer emulsion dosages which may be used for treating slurrys of inorganic particulate solids may be any amount found effective by one skilled in the art through routine experimentation, since these amounts may vary depending upon the substrate treated and the particular water-soluble polymer emulsion used. Generally, preferred dosages tend to range from about 0.01 to about 5 ml of emulsion per 100 g of solids in the slurry, more preferably from about 0.05 to about 1 ml of emulsion per 100 g of slurry solids, assuming the emulsions contain about 15 to about 50 percent polymer solids.

The polymeric emulsions should be admixed, preferably thoroughly, with the dispersion to be stabilized. Any means known to those skilled in the art which can facilitate thorough mixing of the polymeric emulsion with the slurry being treated are preferred. Examples of such mixing means include but are not limited to a centrifugal pump and a static or non-moving mixer or other equivalent means. Any type of static mixer may be preferred. Mixing times as short as 0.1 seconds have been found effective. Preferably, mixing times of less than about 1 second are used. The action of the emulsion appears to be instantaneous, so aging the slurry does not appear to be critical.

It is believed that one skilled in the are can use the preceding description to utilize the present invention to its fullest extent.

DESCRIPTION OF THE PREFERRED EMBODIMENTS

The following examples are set forth for illustration purposes only and are not to be construed as limitations on the present invention as set forth in the appended claims.

In Examples 1–14 below a test for measuring stabilization called the slump test was used to measure the flow characteristics of red mud treated with various polymers. The slump test is a procedure which has been used in the art to characterize the rheology of mineral slurries such as red mud See, *Light Metals*, edited by U. Mannweiler (1994) by The Minerals, Metals & Materials Society. Various water-soluble polymers in emulsion form were tested and compared to water-soluble polymers in dilute aqueous solution and in dry form. The water-soluble polymer emulsions were also compared to water-insoluble polymers in their dry form. Unless stated otherwise, the polymers used in the examples are prepared by conventional macroemulsion polymerization.

For each test in Examples 1–14, the red mud samples to be stabilized were prepared as follows: A sample of red mud was obtained from the suction side of the red mud feed pump. The red mud comprised the underflow from a washer settler plus some sand. The red mud contained approximately 42% suspended solids. 300 g of red mud was added to a beaker and stirred using an overhead stirrer at high speed to create a distinct vortex.

EXAMPLE 1

0.5 g of dry water-insoluble acrylamide/sodium acrylate copolymer containing 30 mole percent anionic functionality and about 0.4 mole percent N,N-methylene bisacrylamide was quickly added to 300 g of the red mud sample while it was being admixed at high speed to create a vortex. After stirring for 15 seconds, the treated red mud was transferred to an open-ended cylinder, 13.1 cm long by 2.45 cm internal diameter which was placed in the center of a piece of paper marked with circles at 5 mm intervals. The cylinder was removed and the treated red mud was allowed to spread out over the paper. The concentric mass of treated red mud was allowed to flow until it stopped and then the diameter of the base of the treated red mud, also called the "pool diameter" herein, was measured. The pool diameter was indicative of the flow characteristics or rheology of the treated red mud. Red mud treated with the water-insoluble acrylamide/sodium acrylate copolymer had a pool diameter of 120 mm.

EXAMPLE 2

The slump test procedure used in Example 1 was followed except that in this example no polymer product was added and a sample of 300 g of un-treated red mud was transferred to the open-ended cylinder. After the cylinder was removed from the center of the paper, the red mud was allowed to spread. The pool diameter was 180+ mm.

EXAMPLE 3

The procedure in Example 1 was repeated using a cationic polyamine in aqueous solution form. The polyamine solution (containing about 50 percent by weight polyamine) was diluted with water to ten times its initial volume by adding 90 ml of water to 10 ml of polyamine solution. Then 2.5 ml of the dilute aqueous solution containing polyamine was added to 100 grams of red mud while the red mud was being stirred as in Example 1. The pool diameter of the treated red mud was 200+ mm.

EXAMPLE 4

1.0 g of dry lime was added to 300 g of red mud in the open-ended cylinder which was removed and the pool diameter measured as in Example 1. The treated red mud flooded the paper having a pool diameter of 200+ mm.

EXAMPLE 5

1.0 ml of the dilute aqueous polyamine solution used in Example 3 was added to 300 grams of red mud. The procedure in Example 1 was used to measure a pool diameter of 180+ mm.

EXAMPLE 6

1 ml of a water-in-oil emulsion of ammonium polyacrylate having 100 mole percent anionic functionality was added to 300 g of red mud under agitation as in Example 1. After the cylinder was removed, the red mud appeared to become more viscous and the pool diameter, was 90 mm.

EXAMPLE 7

1 g of the dry acrylamide/sodium acrylate copolymer in Example 1 was added to 300 g of red mud under agitation as in Example 1. The pool diameter was measured at 120 mm, and showed areas of high viscosity in which discrete particles of the dry copolymer could be seen and areas that appeared unaltered.

EXAMPLES 8–10

Using the procedure in Example 1, various dosages of a water-in-oil emulsion of ammonium polyacrylate having 100 mole percent anionic functionality (30% wt polymer solids) were added to 300 g samples of red mud under agitation. The pool diameter measurements are set forth in Table 1. These results along with the results in Example 6 demonstrate that the ammonium polyacrylate emulsion performs exceptionally well as a stabilizer of mineral-containing dispersions, especially red mud, and is particularly effective with increasing dosage; ammonium polyacrylate emulsion also appears to stabilize red mud better than the water-insoluble acrylamide/sodium acrylate copolymer tested in Examples 1 and 7.

EXAMPLES 11–13

For Examples 11–13 the procedure in Example 1 was used to test the ammonium polyacrylate emulsion tested in Examples 8–10 except that the emulsion was diluted with a kerosene diluent by adding kerosene to the emulsion under agitation. The dilution factors for each Example are set forth in Table 1. The pool diameters were measured as in Example 1 and are also found in Table 1. The results therein demonstrate that diluting the polymer emulsion can enhance the stabilizing effectiveness of a water-soluble polymer emulsion.

EXAMPLE 14

The ammonium polyacrylate emulsion tested in Examples 8–10 was broken (diluted to 100 times its initial volume) by diluting 1 ml of the ammonium polyacrylated emulsion with water 90 ml of water to form a dilute aqueous solution of polymer. The pool diameter, measured as in Example 1, was 180+ mm which demonstrates that emulsion polymers significantly reduce their stabilizing effectiveness if the emulsion is inverted prior to use on the dispersion of mineral solids.

TABLE 1

| EXAMPLE | POLYMER | POLYMER FORM | DILUTION[1] FACTOR (VOL %) | DOSE[2] (Vol or Wt %) | POOL DIAMETER (mm) | COMMENTS |
|---|---|---|---|---|---|---|
| C1 | water-insoluble acrylamide/acrylate | Dry | 0 | 0.5 Wt | 120 | |
| C2 | control | None | — | None | 180+ | Flooded Paper |
| C3 | polyamine | Dilute Solution | 0 | 2.5 Vol | 200+ | Flooded Paper |
| C4 | Lime | Dry | 0 | 1.0 Wt | 200+ | Flooded Paper |
| C5 | polyamine | Dilute Solution | 0 | 1.0 Vol | 180+ | Flooded Paper |
| 6 | ammonium polyacrylate | Emulsion | 0 | 1.0 Vol | 90 | |
| C7 | water-insoluble acrylamide/acrylate | Dry | 0 | 1.0 Wt | 120 | |
| 8 | ammonium polyacrylate | Emulsion | 0 | 0.25 Vol | 120 | |
| 9 | ammonium polyacrylate | Emulsion | 0 | 0.50 Vol | 100 | |
| 10 | ammonium polyacrylate | Emulsion | 0 | 2.0 Vol | 60 | Immobilized |
| 11 | ammonium polyacrylate | Emulsion | 10 | 0.17 Vol | 80 | Immobilized |
| 12 | ammonium polyacrylate | Emulsion | 10 | 0.07 Vol | 130 | |
| 13 | ammonium polyacrylate | Emulsion | 100 | 0.01 Vol | 180+ | Flooded Paper |
| C14 | ammonium polyacrylate | Broken Emulsion | 100 | 0.01 Vol | 180+ | Flooded Paper |

[1]The number of times (volume) the emulsion polymer was diluted with kerosene diluent
[2]Volume of emulsion or solution or weight of dry polymer added to 100 g of red mud
C Comparative tests which do not represent the invention

EXAMPLE 15

The diameter of the pool generated by untreated red mud (43% solids) was determined by the method described in Example 1. The pool diameter was 125 mm. This represents the natural repose angle of the untreated mud can serve as a basis of comparison for Examples 16–22.

EXAMPLE 16

A sample of red mud (43% solids, 600 grams, 400 ml) was weighed into a 600 ml beaker and agitated by an overhead stirrer. The speed of the stirrer was adjusted until a deep vortex developed. An emulsion of polyacrylamide homopolymer (1.30 ml, 0.5 ml emulsion per 100 g dry suspended solids) was added rapidly from a syringe and allowed to mix for 15 seconds. The mud was transferred to a cylinder such as that described in Example 1 except the cylinder was placed on a glass plate and, after 30 seconds, the cylinder was removed and the pool diameter measured. The pool diameter was 90 mm. The mud appeared to be very sticky so that when the cylinder was lifted, the mud would not discharge cleanly. Based on these observations, this emulsion polymer appears to be less preferred in this particular application which uses overhead stirring means. The general procedure used in this Example was followed in Examples 17–36 below.

EXAMPLE 17

Using the test method described in Example 16 an emulsion of a copolymer consisting of three mole percent ammonium acrylate and 97 mole percent acrylamide was tested. The pool diameter was 100 mm, indicating that this emulsion was effective in improving the angle of repose of the red mud.

EXAMPLE 18

Using the test method described in Example 16, an emulsion containing a copolymer of 30 mole percent ammonium acrylate and 70 mole percent acrylamide was tested. The resultant pool diameter was 85 mm, indicating that this emulsion was very effective in increasing the angle of repose of the mud.

EXAMPLE 19

Using the test method described in Example 16, an emulsion of a homopolymer of ammonium acrylate was tested. The final pool diameter was 105 mm, indicating that this emulsion was effective in improving the angle of repose of the mud.

EXAMPLE 20

Using the test method identical to that described in Example 16, an emulsion of a copolymer of 10 mole percent acryloyloxyethyltrimethyl ammonium chloride and 90 mole percent acrylamide was tested. The final pool diameter was 95 mm, indicating that this emulsion was effective in improving the angle of repose of the mud. The treated mud contained discrete granules and was not a completely homogeneous mass as observed in previous examples.

EXAMPLE 21

Using the test method described in Example 16, an emulsion of a copolymer of 20 mole percent acryloyloxyethyltrimethyl ammonium chloride and 80 mole percent acrylamide was tested. The final pool diameter was 110 mm, indicating that this emulsion polymer was effective in improving the angle of repose of the mud. The treated mud appeared to be similar to that observed in Example 20.

EXAMPLE 22

Using the test method described in Example 16, an emulsion of a copolymer of 55 mole percent acryloxyethyltrimethyl ammonium chloride and 45 mole percent acrylamide was tested. The final pool diameter was 100 mm, indicating that this emulsion was effective in improving the angle of repose of the mud. The treated mud appeared to be similar to that observed in Example 20.

EXAMPLE 23

The diameter of the pool formed by a sample of red mud (39.8% total suspended solids) was determined by the method described in Example 1. The pool diameter was greater than 200 mm, 200 mm being the limit of measurement of the pool diameter in this test. The untreated mud continued to flow until it was constrained by the containing vessel. This represents the natural repose angle of the untreated mud and can serve as a basis of comparison for Examples 24-32.

EXAMPLE 24

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate (0.25 ml, 0.29 ml emulsion per 100 g dry suspended solids) was added rapidly from a syringe and allowed to mix for 15 seconds. The mud was transferred to a cylinder such as that described in Example 16. The resultant pool diameter was 180 mm, indicating that, at this level of treatment, the emulsion was effective in improving the repose angle of the mud.

EXAMPLE 25

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate (0.50 ml, 0.58 ml emulsion per 100 g suspended solids) was added rapidly from a syringe and allowed to mix for 15 seconds. The mud was transferred to a cylinder such as that described in Example 16. The resultant pool diameter was 155 mm, indicating that, at this level of treatment, the emulsion was effective in improving the repose angle of the mud.

EXAMPLE 26

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate (1.0 ml, 1.16 ml emulsion per 100 g dry suspended solids) was added rapidly from a syringe and allowed to mix for 15 seconds. The mud was transferred to a cylinder such as that described in Example 16. The resultant pool diameter was 140 mm, indicating that, at this level of treatment, the emulsion was effective in improving the repose angle of the mud.

EXAMPLE 27

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate (2.0 ml, 2.32 ml emulsion per 100 g dry suspended solids) was added rapidly from a syringe and allowed to mix for 15 seconds. During mixing the mud became essentially gelatinized and would not flow. The mud was transferred to a cylinder such as that described in Example 16. When the cylinder was removed the column of mud slumped but did not flow. The resultant pool diameter was 100 mm. These data indicate that, at this level of treatment, the emulsion was capable of gelatinizing the mud, essentially eliminating flow.

EXAMPLE 28

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate was diluted (without breaking the emulsion) by adding 20 ml emulsion to 80 ml naphtha. This diluted emulsion (2.0 ml, 0.46 ml emulsion (100% emulsion basis) per 100 g dry suspended solids) was added rapidly from a syringe and allowed to mix for 15 seconds. The mud was transferred to a cylinder such as that described in Example 16. The resultant pool diameter was 130 mm, indicating that, at this level of treatment, the emulsion was effective in improving the repose angle of the mud and, by diluting the emulsion with four times its volume of a hydrocarbon solvent, its performance was improved when compared with a higher dosage of undiluted emulsion, as illustrated in Example 25.

EXAMPLE 29

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate was diluted by adding 20 ml emulsion to 80 ml naphtha. This diluted emulsion (5.0 ml, 1.16 ml emulsion (100% emulsion basis) per 100 g dry suspended solids) was added rapidly from a syringe and allowed to mix for 15 seconds. The mud was transferred to a cylinder such as that described in Example 16. When the cylinder was removed the column of mud slumped but did not flow. The resultant pool diameter was 100 mm. These data indicate that, at this level of treatment, the emulsion was capable of gelatinizing the mud, essentially eliminating flow. When these data are compared with those in Example 27 it can be seen that, by diluting the emulsion with four times its volume of a hydrocarbon solvent, gelatinization of the mud was achieved at one half the level of treatment required when the undiluted emulsion was used.

EXAMPLE 30

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate was diluted by adding 10 ml emulsion to 90 ml naphtha. This diluted emulsion (2.0 ml, 0.23 ml emulsion (100% emulsion basis) per 100 g dry suspended solids) was added rapidly from a syringe and allowed to mix for 15 seconds. The mud was transferred to a cylinder such as that described in Example 16. The resultant pool diameter was 160 mm, indicating that, at this level of treatment, the emulsion was effective in improving the repose angle of the mud and, by diluting the emulsion with nine times its volume of a hydrocarbon solvent, its performance was improved when compared with a higher dosage of undiluted emulsion, as illustrated in Example 24.

EXAMPLE 31

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate was diluted by adding 10 ml emulsion to 90 ml naphtha. This diluted emulsion (2.0 ml, 0.23 ml emulsion (100% emulsion basis) per 100 g dry suspended solids) was added rapidly from a syringe and allowed to mix for 15 seconds. The mud was transferred to a cylinder such as that described in Example 16. The resultant pool diameter was 160 mm, indicating that, at this level of treatment, the emulsion was effective in improving the repose angle of the mud and, by diluting the emulsion with nine times its volume of a hydrocarbon solvent, its performance was improved when compared with a higher dosage of undiluted emulsion, as illustrated in Example 24.

EXAMPLE 32

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate was diluted by adding 10 ml emulsion to 90 ml naphtha. This diluted emulsion (10.0 ml, 1.16 ml emulsion (100% emulsion basis) per 100 g dry suspended solids) was added rapidly from a syringe and allowed to mix for 15 seconds. The mud was transferred to a cylinder such as that described in Example 16. When the cylinder was removed the column of mud slumped but did not flow. The resultant pool diameter was 100 mm. These data indicate that, at this level of treatment, the emulsion was capable of gelatinizing the mud, essentially eliminating flow. When these data are compared with those in Example 27 it can be seen that, by diluting the emulsion with nine times its volume of a hydrocarbon solvent, gelatinization of the mud was achieved at one half the level of treatment required when the undiluted emulsion was used.

EXAMPLE 33

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate (1.0 ml, 1.6 ml emulsion per 100 g dry suspended solids) was added rapidly from a syringe and allowed to mix for 15 seconds. The mud was transferred to a cylinder such as that described in Example 16. The resultant pool diameter was 105 mm, indicating that, at this level of treatment, the emulsion was effective in improving the repose angle of the mud.

EXAMPLE 34

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate was broken by adding 1.0 ml emulsion to 99 ml water. This inverted emulsion (50.0 ml, 0.58 ml emulsion (100% emulsion basis) per 100 g dry suspended solids) was added rapidly from a syringe and allowed to mix for 15 seconds. The mud was transferred to a cylinder such as that described in Example 16. The resultant pool consisted of discrete flocculated particles of mud and liberated water which resulted in a pool diameter greater than 200 mm, indicating that the inverted emulsion was not effective in improving the repose angle of the mud and, if these data are compared with those in Example 25, the advantages of this invention can be clearly seen.

EXAMPLE 35

A sample of red mud (39.8% solids, 630 grams, 425 ml) was weighed into a 600 ml beaker and agitated by an overhead stirrer. The speed of the stirrer was adjusted until a deep vortex developed. An emulsion of a homopolymer of ammonium acrylate was broken by adding 2.0 ml emulsion to 99 ml water. This inverted emulsion (50.0 ml, 1.16 ml emulsion (100% emulsion basis) per 100 g dry suspended solids) was added rapidly from a syringe and allowed to mix for 15 seconds. The mud was transferred to a cylinder such as that described in Example 16. The resultant pool consisted of areas of flocculated particles of mud surrounded by mud showing no signs of treatment. The pool diameter was 155 mm, indicating that the inverted emulsion was less effective in improving the repose angle of the mud than the equivalent treatment level of the un-broken emulsion, as illustrated in Example 26.

EXAMPLE 36

A sample of red mud (39.8% solids, 630 grams, 425 ml) was weighed into a 600 ml beaker and agitated by an overhead stirrer. The speed of the stirrer was a adjusted until a deep vortex developed. An emulsion of a homopolymer of ammonium acrylate was broken by adding 5.0 emulsion to 95 ml water. This inverted emulsion (50.0 ml, 1.16 ml emulsion (100% emulsion basis) per 100 g dry suspended solids) was added rapidly from a syringe and allowed to mix for 15 seconds. The mud was transferred to a cylinder such as that described in Example 16. The resultant pool consisted of areas of gelatinized material surrounded by mud showing no signs of treatment. The pool diameter was greater than 200 mm, indicating that the aqueous solution of the inverted emulsion was not effective in improving the repose angle of the mud.

EXAMPLES 37–45

For Examples 37–45 the slump test was performed using an open-ended cylinder that can hold 100 ml and has an internal diameter of 31.8 mm. Various dosages of a water-in-oil emulsion of ammonium polyacrylate homopolymer were added to 120 ml samples of three different slurries and each was thoroughly mixed by hand. In Examples 37, 40 and 43 no polymer was used so that the natural angle of repose for each slurry type could be obtained. Tar Sands Tailings (50% (wt) solids) was used in Examples 37–39, a slurry comprising Kaolin (20% (wt) solids) was used in Examples 40–42 and tailings from a platinum mine (70% (wt) solids) was used in Examples 43–45. Each treated slurry sample was then transferred to the cylinder positioned on a glass plate marked with circles at 5 mm intervals. The cylinder was removed and the stabilized slurry was allowed to spread over the plate. The slurry was allowed to flow and the pool diameter was measured (in mm.) after one minute. The results for the various different types of mineral slurries treated, shown in Table 2, demonstrate that water-soluble emulsion polymers, particularly an ammonium polyacrylate emulsion, is effective for stabilizing a wide variety of aqueous slurries. This data also shows that the invention is useful in treating aqueous slurries comprising a wide range of total solids.

TABLE 2

| Example | Aqueous Slurry Treated | Dosage[1](wt. %) | Pool Diameter (mm) |
|---|---|---|---|
| c 37 | Tar Sands Tailings | none | ~200 |
| 38 | (50% solids) | 0.5% | 100 |
| 39 |  | 0.75% | 45 |
| c 40 |  | None | 120 |
| 41 | Kaolin Slurry | 0.2% | 95 |
| 42 | (20% solids) | 0.3% | 75 |
| c 43 | Tailings | None | 120 |
| 44 | from a platinum | 0.2% | 40 |
| 45 | mine | 0.3 | 60 |
|  | (~70% solids) |  |  |

[1]weight of emulsion polymer added per 100 g slurry
C Comparative tests which do not represent the invention

EXAMPLES 46–48

For Examples 46–48 the slump test was performed as in Examples 37–45 to stabilize an aqueous slurry of kaolin containing 20% (wt) solids using various dosages of polymeric microemulsions, identified in Table 3. The polymeric microemulsions were added to 120 ml samples of the slurry and thoroughly mixed by hand. In Example 46 no polymer was used so that the natural angle of pose for that particular slurry could be determined. The pool diameters were measured as in Examples 37–45 and are set forth in Table 3.

EXAMPLES 49–51

For Examples 49–51 the slump test was used as in Examples 37–45 to stabilize tailings from a platinum mine containing 20% (wt) solids with two different polymeric microemulsions at the same dosage. In Example 49, no polymer was used to determine the natural angle of repose for that particular slurry. The pool diameters were measured as in Examples 37–45 and are set forth in Table 3.

The data in Table 3 demonstrates that water-soluble polymer-containing microemulsions are effective for stabilizing various aqueous mineral slurries and that certain polymers microemulsions may be clearly preferred for particular applications.

TABLE 3

| EXAMPLES | AQUEOUS SLURRY TREATED | POLYMER MICRO- EMULSION | DOSAGE[1] (wt %) | POOL DIAMETER (mm) |
|---|---|---|---|---|
| c 46 | kaolin slurry (20% solids) | none | — | 120 |
| 47 | kaolin slurry (20% solids) | quaternary[2] dialkylamino- methyl acrylamide microemulsion 30% (wt) polymer solids | .5% | 95 |
| 48 | kaolin slurry (20% solids) | quaternary[2] dialkylamino- methyl acrylamide microemulsion 30% (wt) polymer solids | 1.0% | 80 |
| c 49 | Platinum Tailings (20% solids) | none | — | 100 |
| 50 | Platinum Tailings (20% solids) | quaternary[2] dialkylamino- methyl acrylamide microemulsion 30% (wt) polymer solids | 0.25 | 45 |
| 51 | Platinum Tailings (20% solids) | ammonium polyacrylate homopolymer 21.6% (wt) polymer solids | 0.25 | 45 |

[1]weight of microemulsion polymer added to 100 g of slurry
[2]approximately 75 mole % quaternary groups
C Comparative tests which do not represent the invention

EXAMPLE 52

In Example 52, red mud was treated with an ammonium polyacrylate homopolymer macroemulsion on a continuous basis rather than a batch basis as described in previous examples. The emulsion and red mud were mixed by introducing them simultaneously to one end of a tubular mixer, fitted with internal baffles to cause turbulence in the flowing mud, and discharging the treated mud from the other end. The type of tubular mixer used is also known as a static or non-moving mixer. Other types of static mixers may also be used, since the type, style, and number of baffles are not critical.

The angle of repose of the mud was measure by constructing a number of fan-shaped troughs which were open at the end most distant from the point at which the mud was introduced. The troughs were two feet wide at the closed end, four feet wide at the open end and thirty feet long.

Red mud (150 gallons per minute (gpm), 38% suspended solids, 703 pounds/minute dry solids equivalent) and emulsion containing a homopolymer of ammonium acrylate (640 ml/min, 0.2 ml per 100 g dry solids) were introduced into the mixing apparatus and the treated mud allowed to flow into the trough until the mud exited the open end. The mud was allowed to stand for one hour, and the difference in height of the mud between the closed and open ends of the trough was measured using a surveyor's transit. The difference in height was 35" which is equivalent to an angle of repose of 5.6 degrees.

EXAMPLE 53

The procedure and apparatus used in Example 52 was used except that compressed air was mixed with the emulsion prior to it being contacted with red mud.

To a pressurized stream of the emulsion of ammonium polyacrylate described in Example 52 (640 ml/min, 0.2 ml per 100 g dry solids) was added compressed air (6.0 standard cubic feed per minute at 40 psig). The mixed streams were then passed through a plurality of orifices to form an intimate mixture of the emulsion and air. This stream was added to the same mixing device described in Example 52 to which red mud (150 gpm, 38% suspended solids, 703 pounds/min dry solids) was added. The difference in height of the mud between the ends of the trough was 45", indicating an angle of repose of 7.2 degrees.

Examples 52–53 show the benefit resulting from diluting a polymer-containing emulsion with air. At the same treatment level of emulsion, pre-mixing the emulsion with air increased the angle of repose by 1.6 degrees.

I claim:

1. A process for stacking a red mud waste slurry, the process comprising:
    a. admixing a red mud waste slurry with a water-in-oil polymer emulsion comprising at least one water-soluble polymer in an amount sufficient to stabilize the red mud waste slurry; and
    b. stacking said stabilized red mud waste slurry to give a stacked red mud waste slurry exhibiting an improved angle of repose; wherein said at least one water-soluble polymer is an anionic polymer containing monomer units selected from the group consisting of (meth) acrylic acid, 2-acrylamido-2-alkysulfonic acids, salts thereof and mixtures thereof.

2. A process according to claim 1, wherein said water-in-oil polymer emulsion is a microemulsion.

3. A process according to claim 1, wherein said waste slurry comprises a clay.

4. A process according to claim 1, wherein said waste slurry comprises phosphate slime.

5. A process according to claim 1, wherein said water-in-oil emulsion is diluted with a diluent prior to admixing the emulsion into the red mud waste slurry.

6. A process according to claim 5, wherein said diluent is a liquid hydrocarbon.

7. A process according to claim 5, wherein said water-in-oil emulsion is diluted to a final volume of from about two to about ten times the initial emulsion volume.

8. A process according to claim 1, wherein the means for admixing the water-in-oil emulsion with the red mud waste slurry is a centrifugal pump or a non-moving mixer.

9. A process according to claim 1, further comprising introducing compressed air into the water-in-oil emulsion before admixing the red mud waste slurry and the water-in-oil emulsion.

10. A process according to claim 1, wherein the amount of said water-in-oil emulsion ranges from about 0.01 to about 5 ml of emulsion per 100 g of solids in the slurry.

11. A process according to claim 1, which further comprises dehydrating the stacked slurry.

12. A stacked composition having an improved angle of repose, said composition comprising a red mud waste slurry admixed with an amount of water-in-oil emulsion sufficient to stabilize said red mud waste slurry, wherein said water-in-oil emulsion comprises a water-soluble polymer selected from the group consisting of anionic polymers comprising anionic monomer units selected from the group consisting of (meth)acrylic acid, 2-acrylamido-2-alkylsulfonic acids, and salts and mixtures thereof.

13. A composition according to claim 12, wherein said water-in-oil emulsion is a microemulsion.

* * * * *